(12) United States Patent
Yang et al.

(10) Patent No.: US 11,767,237 B2
(45) Date of Patent: Sep. 26, 2023

(54) METHOD FOR PREPARING AMORPHOUS MOLYBDENUM OXIDE ADSORPTION MATERIAL AND APPLICATION THEREOF

(71) Applicant: Nanchang Hangkong University, Nanchang (CN)

(72) Inventors: Liming Yang, Nanchang (CN); Xubiao Luo, Nanchang (CN); Xiang Lu, Nanchang (CN); Shenglian Luo, Nanchang (CN); Tingxi Liu, Hohhot (CN)

(73) Assignee: Nanchang Hangkong University, Nanchang (CN)

( * ) Notice: Subject to any disclaimer, the term of this patent is extended or adjusted under 35 U.S.C. 154(b) by 469 days.

(21) Appl. No.: 16/919,933

(22) Filed: Jul. 2, 2020

(65) Prior Publication Data
US 2021/0009440 A1    Jan. 14, 2021

(30) Foreign Application Priority Data
Jul. 8, 2019    (CN) .......................... 201910610869.0

(51) Int. Cl.
*C02F 1/28*    (2023.01)
*B01J 20/02*    (2006.01)
(Continued)

(52) U.S. Cl.
CPC ........... *C02F 1/281* (2013.01); *B01J 20/0218* (2013.01); *B01J 20/3085* (2013.01); *C02F 2101/20* (2013.01)

(58) Field of Classification Search
CPC .... B01J 20/0218; B01J 20/06; B01J 20/3085; C01P 2002/02; C01P 2004/03;
(Continued)

(56) References Cited

FOREIGN PATENT DOCUMENTS

CN    104150536 A    11/2014
CN    105355456 A    2/2016
(Continued)

OTHER PUBLICATIONS

Quintana et al., Structurally and mechanically tunable molybdenum oxide films and patterned submicrometer structures by electrodeposition; Electrochimica Acta, vol. 173, Aug. 10, 2015, pp. 705-714. (Year: 2015).*

(Continued)

*Primary Examiner* — Vishal V Vasisth
(74) *Attorney, Agent, or Firm* — Holzer Patel Drennan

(57) ABSTRACT

The invention relates to a method for preparing amorphous molybdenum oxide adsorption material and an application thereof. The invention aims to solve the technical problem of low recovery efficiency of silver ions in coexisting silver-containing wastewater in the prior art. The method of the present invention includes:1) preparation of electrolyte; and 2) subjecting to cyclic voltammetry. The amorphous molybdenum oxide adsorption material prepared by the present invention is used as an adsorbent for adsorbing and reducing silver ions in wastewater. The invention successfully prepares amorphous molybdenum oxide (MoOx) by cyclic voltammetry, which has a highly selective reduction adsorption for $Ag^+$. Silver ions and the adsorbent MoOx could be subjected to redox reaction to remove silver ions in water. The removal efficiency of the silver ions in wastewater by the amorphous molybdenum oxide prepared by cyclic voltammetry of the invention is up to 99.85%.

5 Claims, 2 Drawing Sheets

(51) Int. Cl.
*B01J 20/30* (2006.01)
*C02F 101/20* (2006.01)

(58) Field of Classification Search
CPC .. C01P 2002/72; C02F 1/281; C02F 2101/20; C01G 39/02
See application file for complete search history.

(56) References Cited

FOREIGN PATENT DOCUMENTS

| | | |
|---|---|---|
| CN | 106976910 A | 7/2017 |
| CN | 108845010 A | 11/2018 |
| WO | 2018098451 A1 | 5/2018 |

OTHER PUBLICATIONS

Wu et al., High efficient and selective removal of Pb2+ through formation of lead haybdate a-MoO3 porous nanosheets array; J Colloid Interface Sci. Apr. 1, 2017;491:80-88. doi: 10.1016/j.jcis.2016.12.029. Epub Dec. 18, 2016 (Year: 2016).*

"First Office Action and Search Report Issued in Chinese Patent Application No. 201910610869", dated Apr. 12, 2021, 9 Pages.

\* cited by examiner

METHOD FOR PREPARING AMORPHOUS MOLYBDENUM OXIDE ADSORPTION MATERIAL AND APPLICATION THEREOF

CROSS REFERENCE TO RELATED APPLICATION

This application claims the priority of Chinese Patent Application No. 201910610869.0, entitled "Method for preparing amorphous molybdenum oxide adsorption material and application thereof" filed with the China National Intellectual Property Administration on Jul. 8, 2019, which is incorporated herein by reference in its entirety.

TECHNICAL FIELD

The present invention relates to a method for preparing amorphous molybdenum oxide adsorption material and an application thereof.

BACKGROUND ART

Silver has been widely used in electronics, chemical industry, medicine, aerospace and other fields. With the massive discharge of industrial wastewater, toxic silver species have inevitably entered the water environment, threatening water safety and human health. In addition, the crisis of depletion of silver resources has become a more urgent global problem due to excessive depletion in various fields. Therefore, seeking the latest technology to capture and recover silver from wastewater is of great significance for a sustainable development in future. It needs to be solved urgently that the coexisting silver-containing wastewater in the prior art has a low recovery efficiency of silver ions.

SUMMARY OF THE INVENTION

The present invention aims to solve the technical problem of low recovery rate of silver ions in the coexisting silver-containing wastewater in the prior art and provides a method for preparing amorphous molybdenum oxide adsorption material and an application thereof.

The method for preparing the amorphous molybdenum oxide adsorption material of the present invention is carried out according to the following steps:

1) preparation of an electrolyte: mixing ammonium molybdate and sodium sulfate together in water, and stirring ultrasonically for 5 min to 10 min to obtain a mixed solution, wherein in the mixed solution, the concentration of ammonium molybdate is 2 mmol/L to 2.5 mmol/L and that of sodium sulfate is 0.5 mol/L to 0.6 mol/L; and 2) subjecting to cyclic voltammetry: connecting an electrochemical workstation, and subjecting the mixed solution prepared in step 1) as the electrolyte to electrodeposition for 25 to 30 cycles by cyclic voltammetry to obtain amorphous molybdenum oxide adsorption material, wherein the cyclic voltammetry has the potential window of −0.09 V to −1.29 V and the sweep speed of 50 mV/s to 60 mV/s.

The amorphous molybdenum oxide adsorption material prepared by the present invention is used as an adsorbent for adsorbing and reducing silver ions in wastewater.

The amorphous molybdenum oxide ($MoO_x$) is successfully prepared in present invention by cyclic voltammetry. The adsorbent has a highly selective reduction adsorption on $Ag^+$, and can adsorb silver ions and reduce them on adsorbent $MoO_x$. Silver ions and adsorbent $MoO_x$ could be subjected to the redox reaction to remove silver ions in silver-containing wastewater. The theoretical basis of the method just mentioned is to selectively adsorb and reduce metal ions in silver-containing wastewater by oxidation-reduction potential of silver ions.

In the present invention, the removal efficiency of silver ions in wastewater by amorphous molybdenum oxide prepared by cyclic voltammetry is up to 99.85%. Thus, the invention can provide a guiding direction for the selective adsorption and reduction of precious metals in wastewater, and for the recycling of precious metals.

DETAILED DESCRIPTION OF THE EMBODIMENTS

Figure 1:
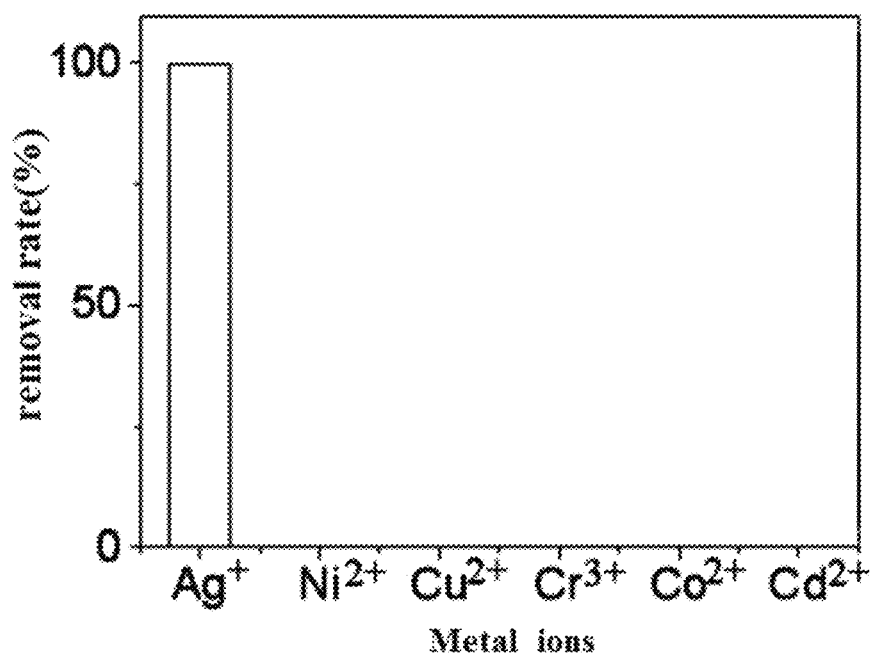
FIG. 1 is a graph showing the removal efficiency of various metal ions in wastewater tested in Experiment 2.

The specific embodiment 1: A method for preparing amorphous molybdenum oxide adsorption material was carried out according to the following steps:

1) preparation of electrolyte: mixing ammonium molybdate and sodium sulfate together in water, and stirring ultrasonically for 5 min to 10 min to obtain a mixed solution, wherein in the mixed solution, the concentration of ammonium molybdate was 2 mmol/L to 2.5 mmol/L, and that of sodium sulfate was 0.5 mol/L to 0.6 mol/L; and 2) subjecting to cyclic voltammetry: connecting an electrochemical workstation, and subjecting the mixed solution prepared in step 1) as an electrolyte to electrodeposition for 25 to 30 cycles by cyclic voltammetry to obtain the amorphous molybdenum oxide adsorption material, wherein the cyclic voltammetry has the potential window of −0.09 V to −1.29 V and the sweep speed of 50 mV/s to 60 mV/s.

The specific embodiment 2: The embodiment was different from the above embodiment 1 in that in the mixed solution in step 1), the concentration of ammonium molybdate was 2 mmol/L, and that of sodium sulfate was 0.5 mol/L. Others were the same as those in embodiment 1.

The specific embodiment 3: The embodiment was different from the above embodiment 1 or 2 in that the electrochemical workstation in Step 2) has the model of CHI760E. Others were the same as those in embodiment 1 or 2.

The specific embodiment 4: The embodiment was different from the above embodiment 3 in that in the electrochemical workstation in step 2), the working electrode was conductive glass ITO, the counter electrode was platinum electrode, and the reference electrode was silver/silver chloride. Others were the same as those in embodiment 3.

The specific embodiment 5: The embodiment was an application of the amorphous molybdenum oxide adsorption material prepared in the specific embodiment 1 as an adsorbent for adsorbing and reducing silver ions in wastewater.

The specific embodiment 6: The embodiment was different from the above embodiment 5 in the usage method of adsorbent: putting the adsorbent in wastewater and stirring for 5 h to 5.5 h to adsorb silver ions completely. Others were the same as those in embodiment 5.

The following experiments were used to verify the present invention.

Experiment 1: A method for preparing amorphous molybdenum oxide adsorption material was carried out according to the following steps:

1) preparation of electrolyte: mixing ammonium molybdate and sodium sulfate together in 100 ml of deionized water, and stirring ultrasonically for 10 min to obtain a mixed solution, wherein in the mixed solution, the concentration of ammonium molybdate was 2 mmol/L, and that of sodium sulfate was 0.5 mol/L; and 2) subjecting to cyclic voltammetry: connecting an electrochemical workstation, and subjecting the mixed solution prepared in step 1) as an electrolyte to electrodeposition for 25 cycles by cyclic voltammetry to obtain amorphous molybdenum oxide adsorption material, wherein the cyclic voltammetry has the potential window of −0.09 V to −1.29 V and the sweep speed of 50 mV/s.

The electrochemical workstation in step 2) has the model of CHI760E, and in the workstation the working electrode was conductive glass ITO, the counter electrode was a platinum electrode, and the reference electrode was silver/silver chloride, wherein the conductive glass ITO has a size of 1 cm×4 cm×1.1 mm.

Experiment 2: The working electrode located with amorphous molybdenum oxide adsorption material prepared in Experiment 1 was put into wastewater, and was stirred for 5 h-5.5 h to adsorb silver ions completely, wherein wastewater has the volume of 100 mL, and includes $Ag^+$, $CO^{2+}$, $Ni^{2+}$, $Cr^{3+}$, $Cu^{2+}$ and $Cd^{2+}$ in the concentrations of all 20 mg/L.

FIG. 1 is a graph showing the removal efficiency of various metal ions in wastewater tested in Experiment 2. As can be seen from the figure, the amorphous molybdenum oxide MoOx prepared in the Experiment 1 exhibits good selectivity for silver ions and good removal efficiency for silver ions, up to 99.85%.

Figure 2:
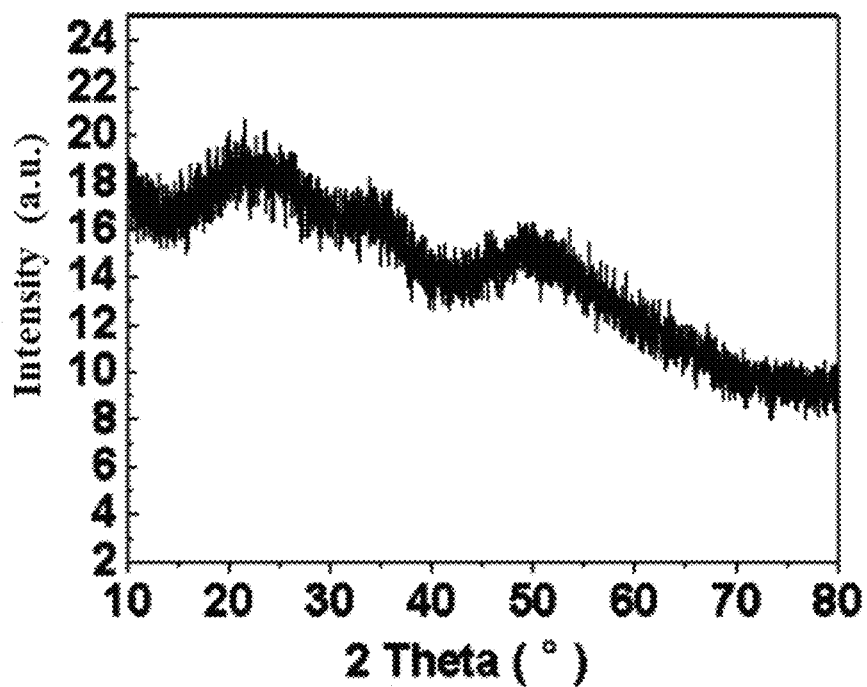
FIG. 2 shows a XRD diagram of the amorphous molybdenum oxide adsorption material prepared in Experiment 1.

FIG. 2 is a XRD diagram of the amorphous molybdenum oxide adsorption material prepared in Experiment 1. As can be seen from the figure, MoOx prepared in Experiment 1 is amorphous.

Figure 3:
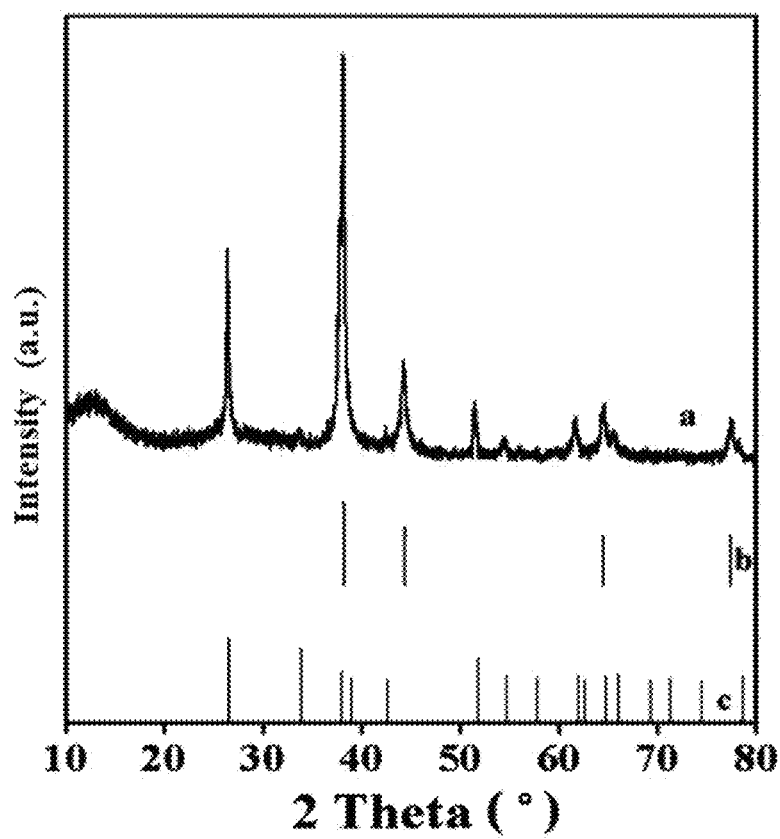
FIG. 3 shows a XRD diagram of working electrode loaded with amorphous molybdenum oxide adsorption material after absorbing silver ions tested in Experiment 2.

FIG. 3 is a XRD diagram of the working electrode loaded with the amorphous molybdenum oxide adsorption material tested in Experiment 2, wherein curve a represents an actually measured curve, curved b represents a standard tin oxide, curve c represents a standard elementary substance Ag. As can be seen from the figure, the metallic Ag has been reduced.

Figure 4:
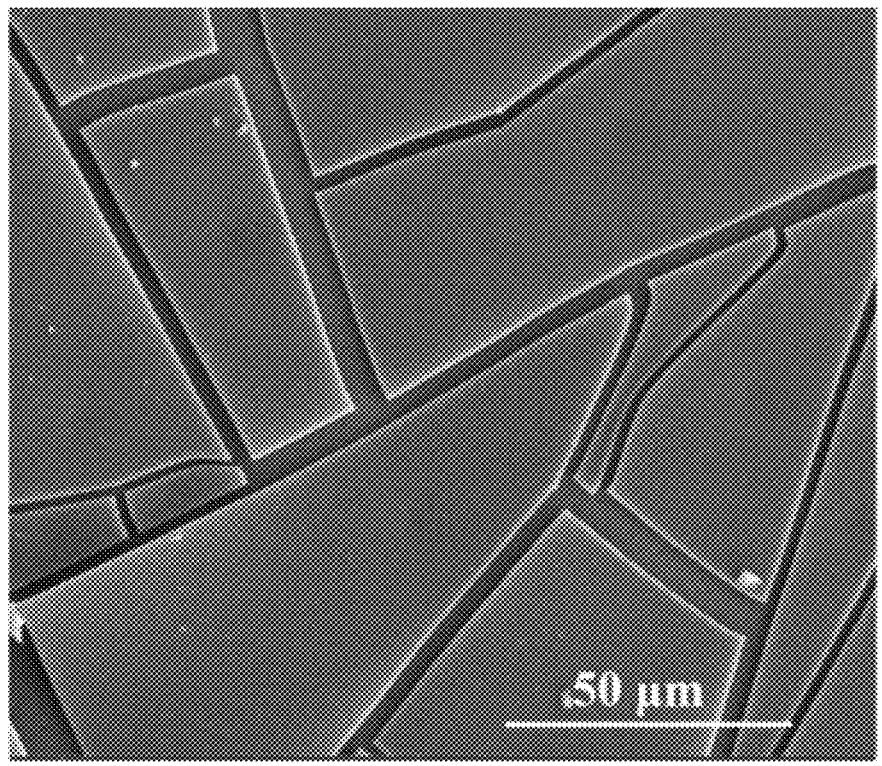
FIG. 4 shows a SEM diagram of the amorphous molybdenum oxide adsorption material prepared in Experiment 1.

FIG. 4 is a SEM diagram of the amorphous molybdenum oxide adsorption material prepared in Experiment 1. As can be seen from the figure, the amorphous molybdenum oxide adsorption material has a sheet structure.

What is claimed is:

1. A method for preparing an amorphous molybdenum oxide adsorption material as an adsorbent for adsorbing and reducing silver ions, which is carried out by the following steps:
    1) Preparation of an electrolyte: mixing ammonium molybdate and sodium sulfate together in water, and stirring ultrasonically for 5 min to 10 min to obtain a mixed solution, wherein in the mixed solution, the concentration of ammonium molybdate is 2 mmol/L to 2.5 mmol/L, and that of sodium sulfate is 0.5 mol/L to 0.6 mol/L; and
    2) Subjecting to cyclic voltammetry: connecting an electrochemical workstation, and subjecting the mixed solution prepared in step 1) as the electrolyte to electrodeposition for 25 to 30 cycles by cyclic voltammetry to obtain the amorphous molybdenum oxide adsorption material, wherein the cyclic voltammetry has the potential window of −0.09 V to −1.29 V and the sweep speed of 50 mV/s to 60 mV/s.

2. The method of claim 1, wherein in the mixed solution in step 1), the concentration of ammonium molybdate is 2 mmol/L and that of sodium sulfate is 0.5 mol/L.

3. The method of claim 1, wherein in the electrochemical workstation in step 2) the working electrode is conductive glass ITO, the counter electrode is a platinum electrode, and the reference electrode is silver/silver chloride.

4. An application of the amorphous molybdenum oxide adsorption material of claim 1 as an adsorbent for adsorbing and reducing silver ions in wastewater.

5. The application of the amorphous molybdenum oxide adsorption material according to claim 4, wherein the application method comprises: putting the amorphous molybdenum oxide adsorption material as the adsorbent into silver ions-containing wastewater, and stirring for 5 h-5.5 h to adsorb silver ions completely.

* * * * *